(12) United States Patent
Soong et al.

(10) Patent No.: US 8,785,027 B2
(45) Date of Patent: Jul. 22, 2014

(54) BATTERY PACK HAVING COOLING SYSTEM

(75) Inventors: Tzu Wen Soong, Taipei (TW); Hsun Hao Chieh, Taipei (TW)

(73) Assignee: Go-Tech Energy Co., Ltd., New Taipei (TW)

( * ) Notice: Subject to any disclaimer, the term of this patent is extended or adjusted under 35 U.S.C. 154(b) by 98 days.

(21) Appl. No.: 13/253,280

(22) Filed: Oct. 5, 2011

(65) Prior Publication Data

US 2013/0089768 A1    Apr. 11, 2013

(51) Int. Cl.
*H01M 10/50*    (2006.01)

(52) U.S. Cl.
USPC ............ 429/120; 429/152; 429/155; 429/149

(58) Field of Classification Search
CPC ..................... H01M 2/1077; H01M 10/5004
USPC .................. 429/421, 152, 155, 159
See application file for complete search history.

(56) References Cited

U.S. PATENT DOCUMENTS

| | | |
|---|---|---|
| 2007/0020513 A1 | 1/2007 | Medina et al. |
| 2008/0068801 A1* | 3/2008 | Wilk ............................. 361/702 |
| 2009/0148754 A1* | 6/2009 | Marchio et al. ................. 429/83 |
| 2010/0136405 A1 | 6/2010 | Johnson et al. |

FOREIGN PATENT DOCUMENTS

WO    2011/092773 A1    8/2011

OTHER PUBLICATIONS

Search Report dated Feb. 5, 2013 issued in corresponding European application No. 12 18 7315.

* cited by examiner

*Primary Examiner* — Jane Rhee
(74) *Attorney, Agent, or Firm* — Bacon & Thomas, PLLC (57) ABSTRACT

A battery pack having a cooling system is disclosed. The battery pack includes battery units linked in series or in parallel and arranged in a plane; thermal conducting bars each has a number of side walls and two ends, averagely located among the battery units and substantially contacted to the battery units by the side walls, for conducting heat out of the battery units to the two ends; and a housing for containing the battery units and thermal conducting bars and conducting heat from the ends of the thermal conducting bars to outside of the housing. At least one end of the thermal conducting bar is connected to the housing and becomes an internal supporting structure of the housing.

17 Claims, 9 Drawing Sheets

BATTERY PACK HAVING COOLING SYSTEM

FIELD OF THE INVENTION

The present invention relates to a battery pack. More particularly, the present invention relates to a battery pack having a cooling system to dissipate heat from the battery pack. It can be applied to huge power required host, such as an electric vehicle.

BACKGROUND OF THE INVENTION

An electric vehicle, also referred to as an electric drive vehicle, is a moving vehicle using one or more electric motors as driving system. Not like petroleum-based transportations which are moved by the energy from burning gasoline, the electric vehicles use electric power as their propulsion. They won't generate waste gas. Noise is also less. During the last few decades, increased concern over the environmental impact of the petroleum-based transportation, along with the spectre of peak oil, has led to renewed interest in an electric transportation. Electric power for electric vehicles can be generated from a wide range of sources, including fossil fuels, nuclear power, and renewable sources such as tidal power, solar power, and wind or any combination of those.

Some of the electric vehicles or even hybrid electric vehicles are now being commercially used. A nickel-metal hydride (Ni-MH) secondary battery has been mainly used as the power source for the electric vehicles (EV) and the hybrid electric vehicles (HEV). In recent years, even the use of a lithium-ion secondary battery has been attempted. High output and large capacity are needed for such secondary batteries to provide. For this reason, many small-sized secondary batteries (unit cells) are connected in series or in parallel with each other so as to construct a battery module. Many battery modules are connected in parallel or in series with each other so as to construct a battery pack.

In such a high-output, large-capacity battery pack, however, a large amount of heat is generated from the unit cells during the charge and the discharge of the unit cells. When the heat generated from the unit cells during the charge and the discharge of the unit cells is not effectively removed, heat is accumulated in the unit cells with the result that the unit cells are degraded. Consequently, it is necessary to provide a cooling system for such battery packs.

Particularly when a battery module is used to drive a motor for a hybrid electric vehicle (HEV), it is important to have adequate heat dissipation. If heat is not dissipated properly, the heat generated from the unit cells causes a temperature variation among the unit cells. The heat generated at the unit cells may also cause the temperature inside the unit cells to increase, resulting in explosion thereof.

Since a battery module for a HEY is charged and discharged by a high current, it may have deteriorated performance due to the heat generated by the internal reaction of a rechargeable battery.

Figure 1:
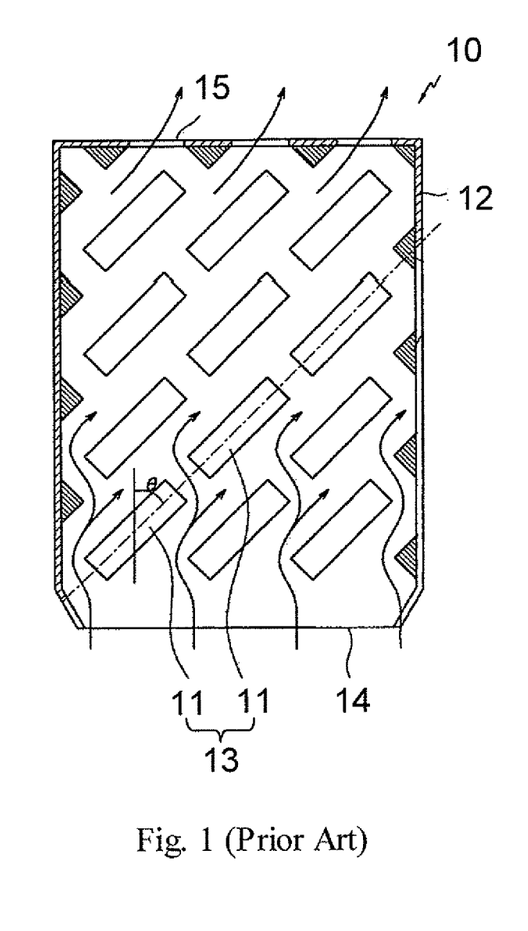
FIG. 1 shows a prior art of a battery pack having cooling structure.

Please refer to FIG. 1. U.S. Pat. No. 7,795,845 discloses a rechargeable battery module 10 including a plurality of unit cells 11; and a housing 12 in which the unit cells 11 are mounted and in which a coolant (indicated by the arrows) for controlling the temperature in the housing 12 circulates. The unit cells 11 are disposed in the housing 12 on a slant at a predetermined angle with respect to an inflow of the coolant. The prismatic unit cells 11 are arranged at predetermined intervals inside the housing 12 to form a cell series 13. The housing 12 has an inlet 14 at one side, through which air for regulating the temperature of the unit cells 11 can flow in, and an outlet 15 at the other side thereof, through which the air passing by the unit cells 11 can dissipate. However, the intervals between the unit cells 11 can't be too small or else the coolant won't be able to circulate, and therefore, the size of the rechargeable battery module 10 is limited and can't be minimized.

Figure 2:
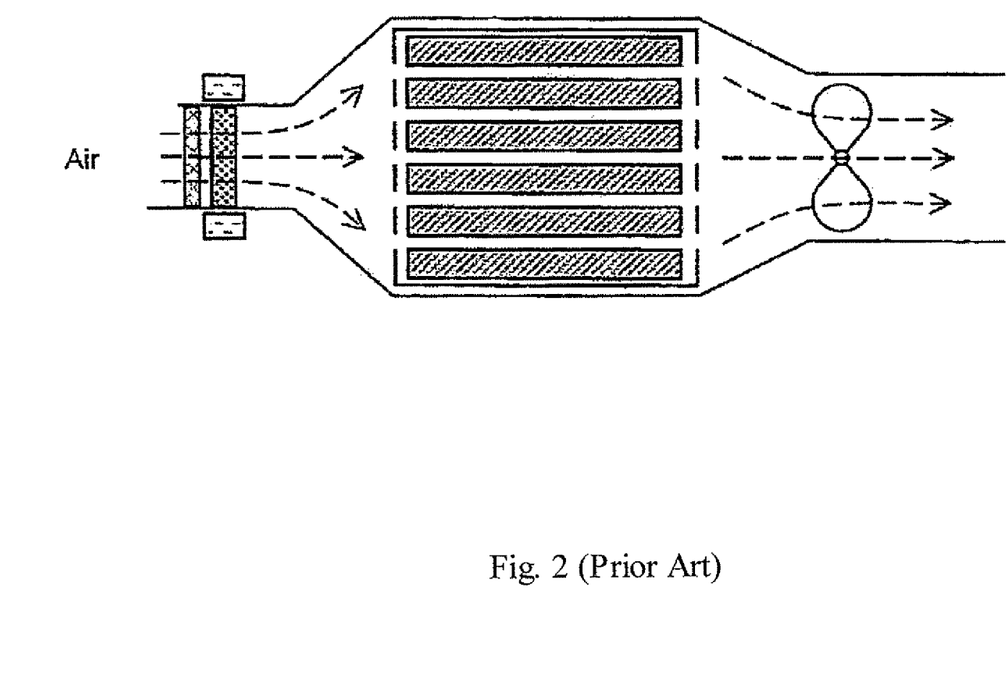
FIG. 2 shows another prior art of a battery pack having cooling structure.

Please Refer to FIG. 2. US Pub. No. 2007/0196728 discloses a battery that has a double filter device mounted at an air inlet part, through which air for cooling the battery pack. The double filter includes a pre-filter having relatively large air holes. The pre-filter has high frequency of replacement and a medium filter has relatively small air holes. The medium filter having low frequency of replacement. The pre-filter is located before the medium filter in the direction in which the air is introduced. Consequently, dust is removed from the air and the cooling efficiency of the battery pack is increased. However, such structure makes the battery bulgy which is not suitable for compact designs of battery packs.

Thus, a battery pack having an efficient cooling system which has a compact size and can also enhance the structure of the battery pack is desperately needed.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In accordance with an aspect of the present invention, a battery pack having a cooling system, includes: a plurality of battery units linked in series or in parallel and arranged in a plane for providing power; a plurality of thermal conducting bars each has a number of side walls and two ends, averagely located among the battery units and substantially contacted to the battery units by the side walls, for conducting heat out of the battery units to the two ends; and a housing for containing the battery units and thermal conducting bars and conducting heat from the ends of the thermal conducting bars to outside of the housing; wherein at least one end of the thermal conducting bar is connected to the housing and becomes an internal supporting structure of the housing.

Preferably, the battery pack further includes a fixture for fixing the battery units and thermal conducting bars on the plane.

Preferably, the thermal conducting bars include a fixture for fixing the battery units on the plane.

Preferably, the battery unit is a rechargeable battery.

Preferably, the thermal conducting bar is made of a thermal conductive material.

Preferably, the thermal conductive material is a metal or alloy.

Preferably, the metal is aluminum.

Preferably, the thermal conducting bar is hollow.

Preferably, the battery pack further includes a circulating system providing cooling liquid passing through the hollow portion of the thermal conducting bar from one end to the other for speeding up heat conduction.

Preferably, the cooling liquid is water, ethanol, glycol or oil.

Preferably, the number of side walls equals the number of battery units surrounding the thermal conducting bar.

Preferably, the side wall has a shape which is substantially the same as a portion of battery unit which contacts the thermal conducting bar.

Preferably, the thermal conducting bar is fixed to the housing by screws and heat of the thermal conducting bar can be conducted to outside of the housing via the screws or by contact with the housing.

Preferably, the housing is made of a thermal conductive material.

Preferably, the thermal conductive material is aluminum.

Preferably, the fixture is made of an insulator.

Preferably, the insulator is plastic.

Preferably, the fixture is made of thermal conductive material.

DETAILED DESCRIPTION OF THE PREFERRED EMBODIMENTS

The present invention will now be described more specifically with reference to the following embodiments. It is to be noted that the following descriptions of preferred embodiments of this invention are presented herein for purpose of illumination and description only; it is not intended to be exhaustive or to be limited to the precise form disclosed.

First Embodiment

Figure 3:
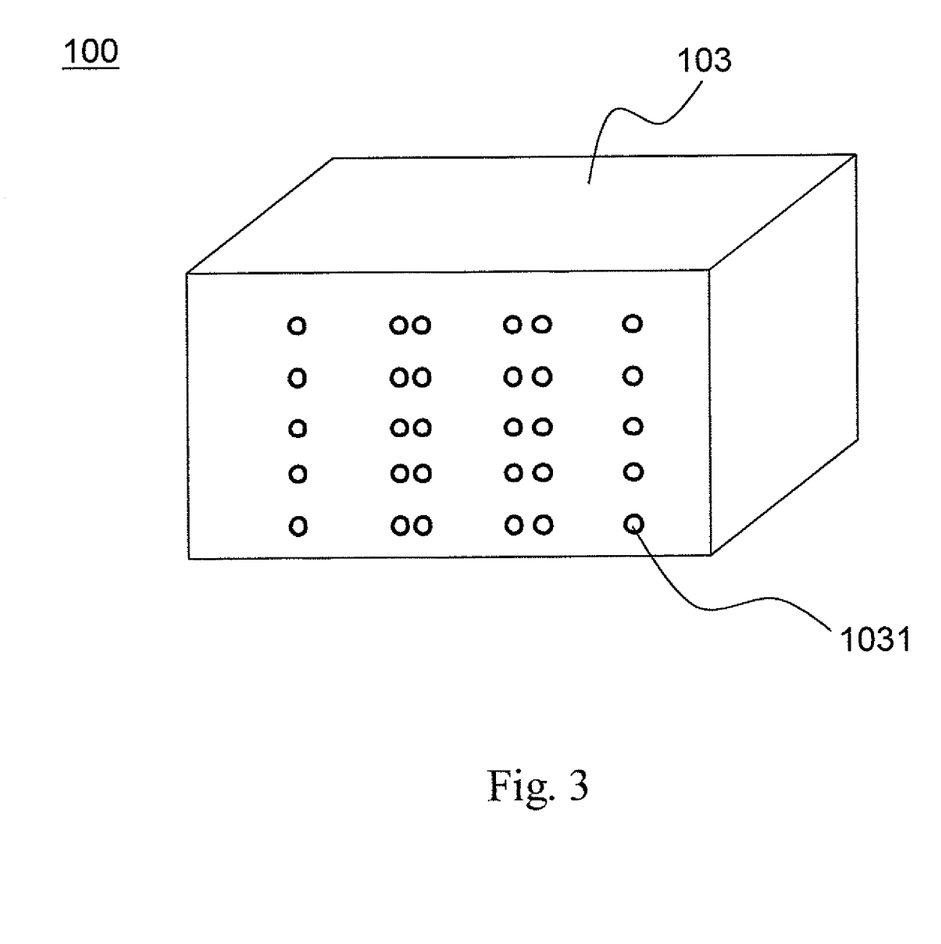
FIG. 3 illustrates a housing of a battery pack according to a first embodiment of the present invention.
Figure 4:
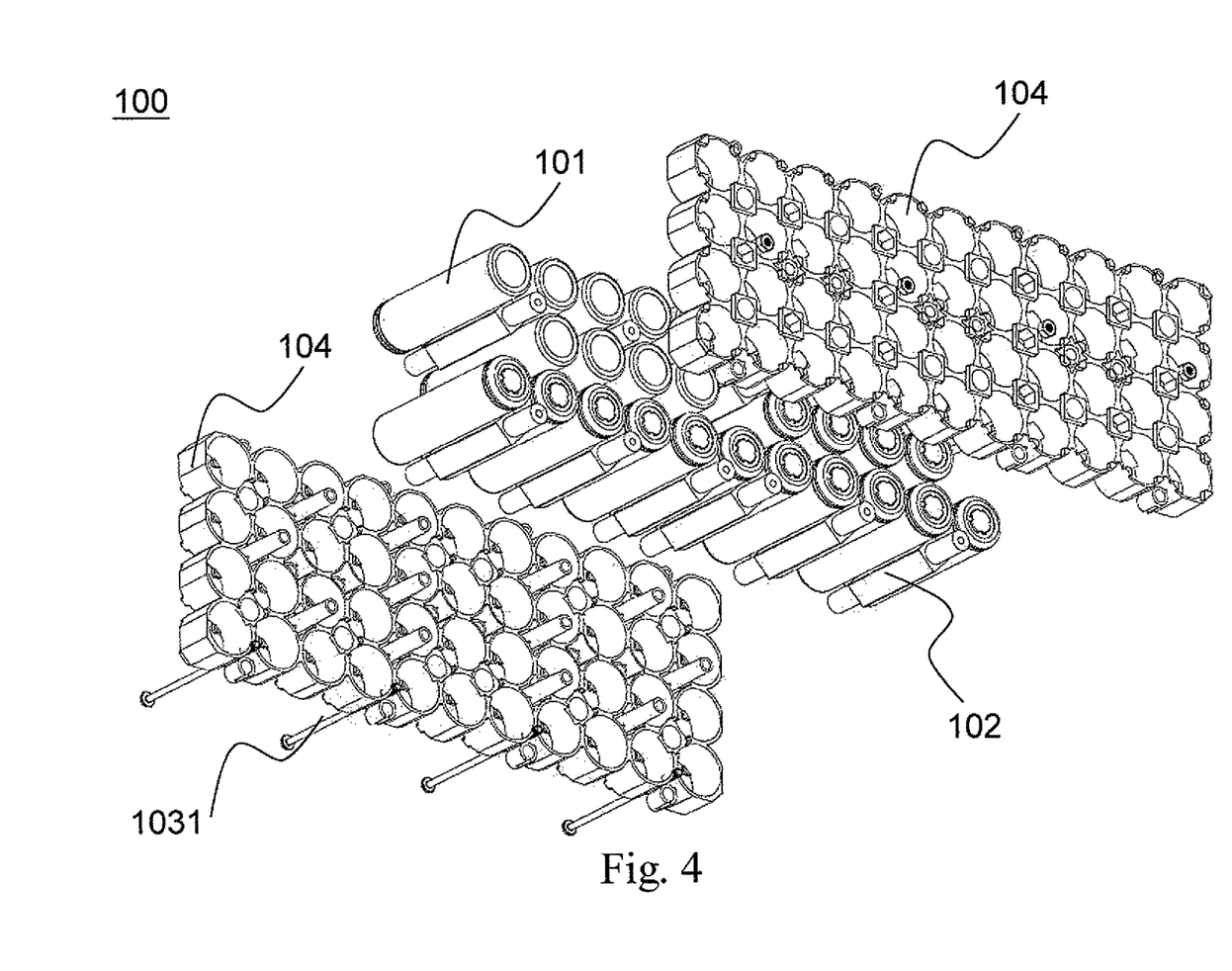
FIG. 4 is an explosion diagram of the battery pack without the housing according to the first embodiment.
Figure 5:
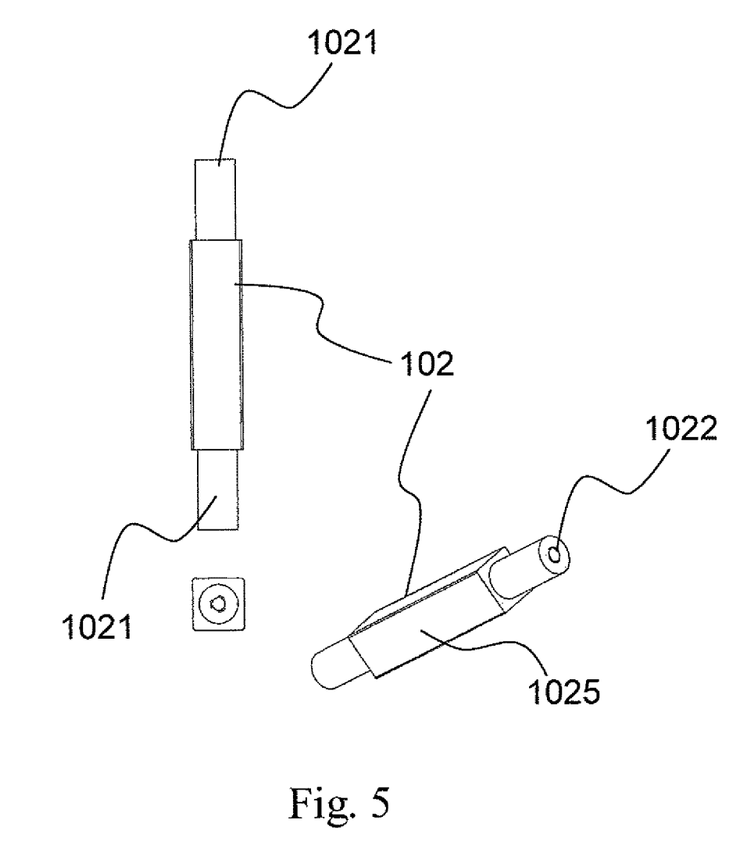
FIG. 5 illustrates a thermal conducting bar of the first embodiment.

Please refer to FIGS. 3 to 5. A first embodiment is illustrated. Please refer to FIG. 3. It shows an appearance of a housing 103 of a battery pack 100. As shown, there are many screws 1031 on the housing 103. Functions of the screws 1031 will be described later in this embodiment.

Next, please refer to FIG. 4. It is an explosion diagram of the battery pack 100 without the housing 103. The battery pack 100 has a number of battery units 101, a number of thermal conducting bars 102 and two fixtures 104. The battery units 101 are linked in series or in parallel and arranged in a plane. They are the basic units to provide power. In order to have a comprehensive understanding of the thermal conducting bar 102, please refer to FIG. 5. The thermal conducting bar 102 has four side walls 1025 and two ends 1021. Please refer to FIGS. 4 and 5 at the same time. The thermal conducting bar 102 is averagely located among the battery units 101 and substantially contacted to the battery units 101 by the side walls 1025. That is to say, each side wall 1025 contacts with a battery unit 101 and a thermal conducting bar 102 in this embodiment is enclosed by four battery units 101. The thermal conducting bar 102 can conduct heat out of the battery units 101 from the two ends 1021.

The housing 103 is used to contain the battery units 101 and thermal conducting bars 102. It can also conduct heat from the ends 1021 of the thermal conducting bars 102 to outside environment. One end 1021 of the thermal conducting bar 102 is connected to the housing 103 by fixing the screw 1031 into a screw hole 1022 of the thermal conducting bar 102 which also becomes an internal supporting structure of the housing 103. It can prevent the housing 103 from deformation when external forces exert on the housing 103.

According to the spirits of the present invention, several points should be noticed. First, the thermal conducting bar 102 is connected to the housing 103 not only by screwing one end 1021 of the thermal conducting bar 102. Both of two ends 1021 can be screwed if there are only contain a single layer battery pack 100. In other words, the housing 103 is not limited to accommodate a single layer battery pack 100, more than one layers of battery packs 100 can be stacked together. The fixture 104 is used to fix the battery units 101 and thermal conducting bars 102 so that they can be well arranged on a plane. In this embodiment, the battery unit 101 is a rechargeable battery. However, in practice, primary batteries can also be used. The thermal conducting bar 102 can be made of a thermal conductive material. Normally, the thermal conductive material is a metal or alloy. In the present embodiment, aluminum is used. The housing 103 is also made of a thermal conductive material. Similar to the thermal conducting bars 102, the thermal conductive material is also aluminum.

Last, the fixture 104 is made of an insulator. In this embodiment, the insulator is plastic. Use of plastic is to prevent the battery units 101 from power leakage.

Second Embodiment

In the first embodiment, the thermal conducting bar 102 is a solid element and just has two ends 1021 drilled for screwing. According to the spirits of the present invention, the thermal conducting bar 102 can be hollow.

Figure 6:
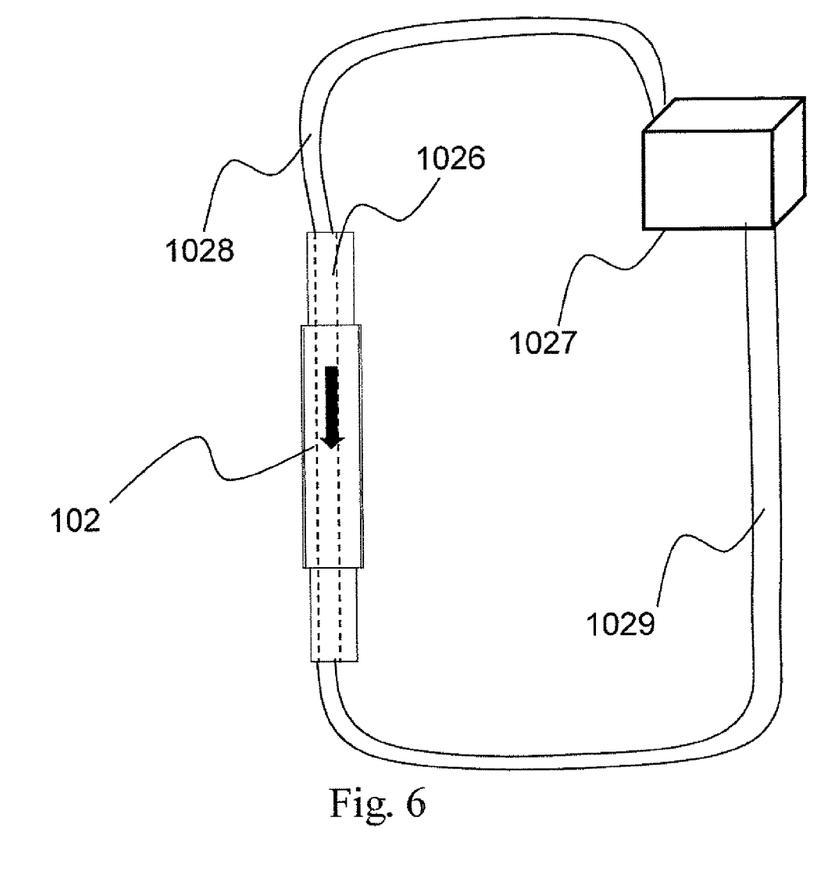
FIG. 6 is a schematic diagram of a second embodiment of the present invention.

Please refer to FIG. 6. A second embodiment is illustrated. There are many elements identical between the first and second embodiments. Those elements have the same functions. The only difference is in the thermal conducting bar 102. The thermal conducting bar 102 in the second embodiment is hollow. Therefore, a channel 1026 (although not seen but shown in dashed lines) is formed through the thermal conducting bar 102. A pump 1027 and two pipes 1028 and 1029 form a circulating system. The circulating system provides cooling liquid passing through the channel 1026 of the thermal conducting bar 102 from one end 1021 to the other. Thus, heat conduction can speed up. Water is used for the cooling liquid and follows the circulation direction shown in a solid arrow in FIG. 6. In practice, the cooling liquid can be ethanol, glycol or oil.

It should be emphasized that not all of the thermal conducting bars 102 are necessary to connect to the circulating system according to the spirits of the present invention. Several thermal conducting bars 102 can still connect to the housing 103 mentioned in the first embodiment by the screws 1031 so that the housing 103 can have sufficient internal supports.

Third Embodiment

Figure 7:
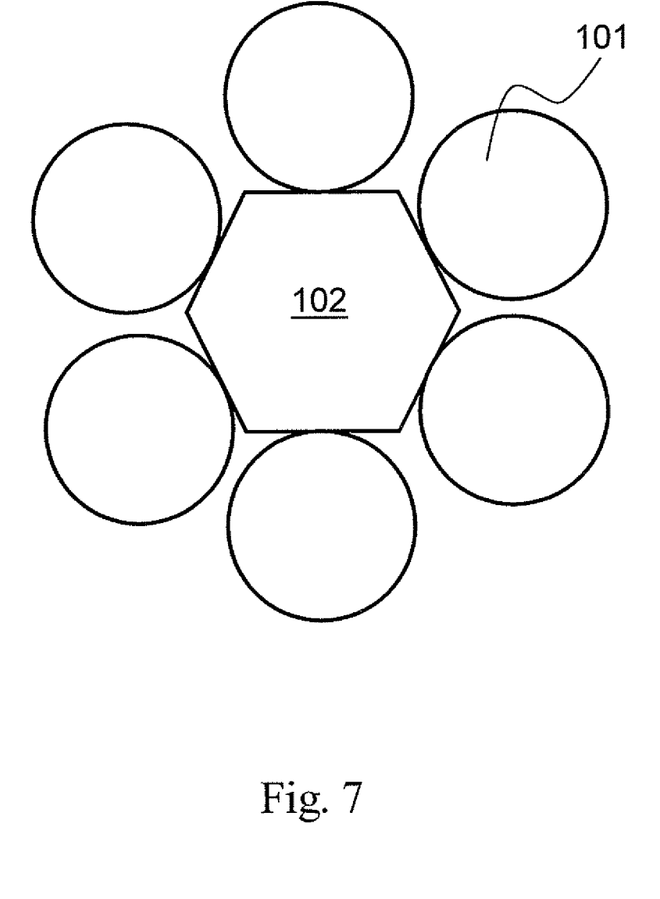
FIG. 7 is a cross sectional view of a thermal conducting bar in the battery pack according to a third embodiment of the present invention.
Figure 8:
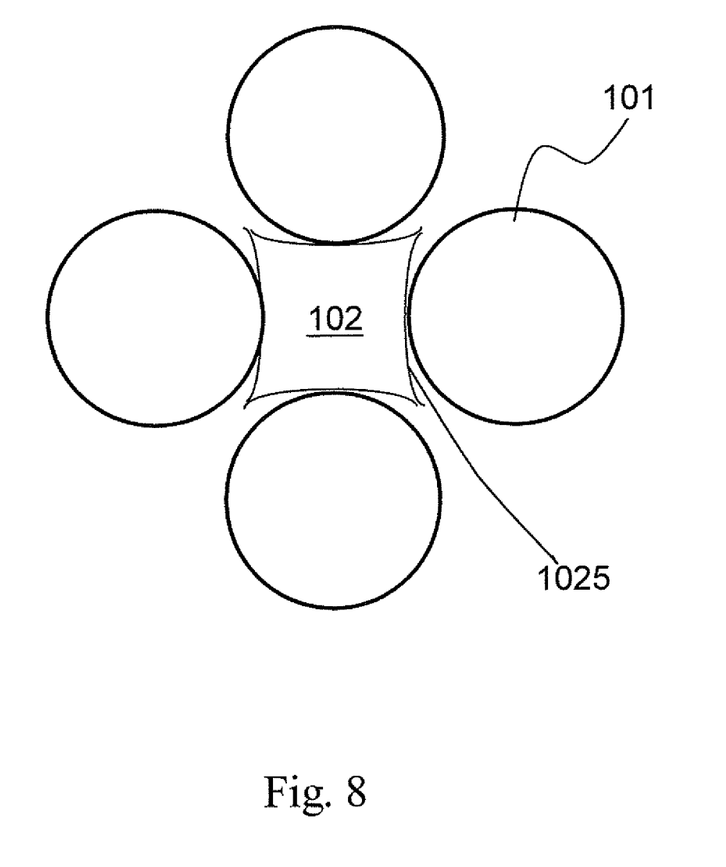
FIG. 8 is another cross sectional view of a thermal conducting bar in the battery pack according to the third embodiment of the present invention.

Please refer to FIG. 7 and FIG. 8. A third embodiment is illustrated. According to the present invention, the number of side walls 1025 equals the number of battery units 101 surrounding the thermal conducting bar 102 mentioned in the first embodiment. The side wall 1025 is substantially the same as a portion of battery unit 101 which contacts the thermal conducting bar 102.

Members having like functions will be identified by the same reference numerals and overlapping descriptions will be omitted. Please refer to FIG. 7 which illustrates a cross sectional view of the thermal conducting bar 102 and the battery units 101 thereof surrounded. In the first embodiment, the thermal conducting bar 102 has a cross section of a square. In this embodiment, the thermal conducting bar 102 has a cross section of a hexagon which allows six battery units 101 to be contacted. The thermal conducting bar 102 is used to efficiently dissipate heat radiated from the battery units 101. The shape of the cross section of the thermal conducting bar 102 depends on the amount of battery units 101 that the thermal conducting bar 102 is surrounded in. Please understand that the amount of side walls is not limited to equal to the amount of battery units 101 that the thermal conducting bar 102 is surrounded in as described in this embodiment. For example, two or more battery units 101 may be contacted to the same side wall 1025 while there are more than one layers of battery units 101 stacked together.

Finally, please refer to FIG. 8. The side wall 1025 of the thermal conducting bar 102 is a concave curve so that it can have more contact area with the battery units 101 surrounded. Consequently, cooling effect can be better than a plane shape.

Figure 9:
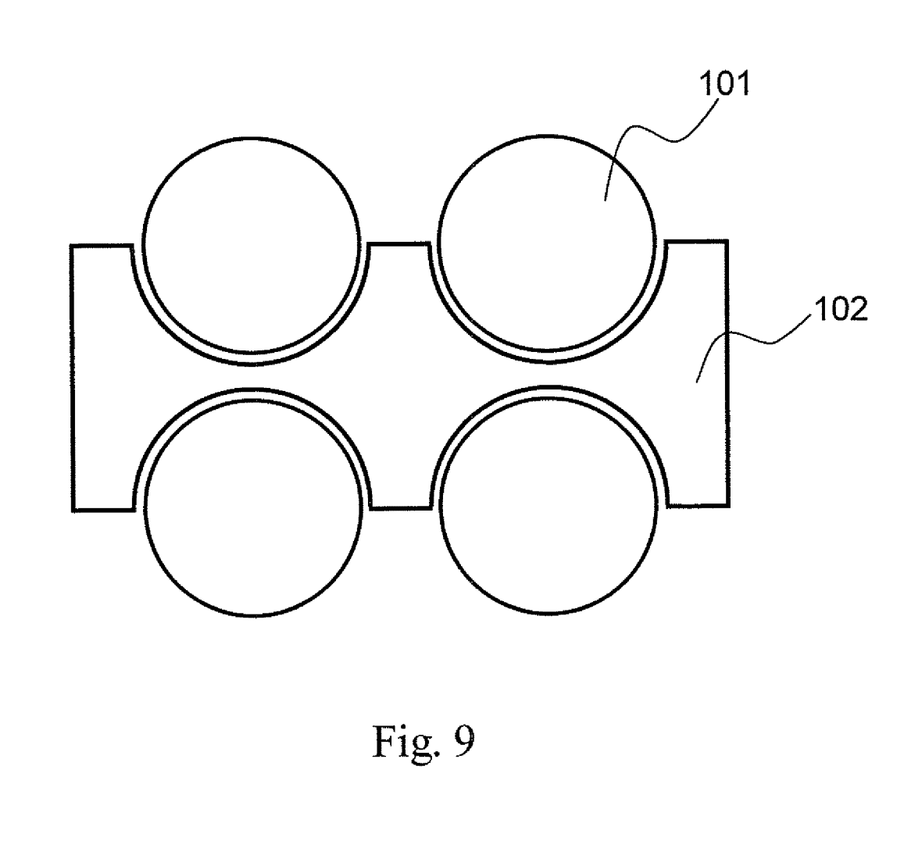
FIG. 9 illustrates a thermal conducting bar including a fixture.

Furthermore, although in the aforementioned embodiments the fixture 104 and the thermal conducting bars 102 are two separated elements, it should be understood that they can be combined into one, as shown in FIG. 9. Meaning that, the thermal conducting bars 102 can include a fixture 102 for fixing the battery units 101 on the plane. In this case, the fixture 102 would be made of thermal conductive material as that of the thermal conducting bars 102.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A battery pack having a cooling system, comprising:
   a plurality of battery units linked in series or in parallel and arranged in a plane for providing power;
   a plurality of thermal conducting bars each has at least four lateral faces and two ends, averagely located among the battery units and substantially contacted to the battery units by the lateral faces, for conducting heat out of the battery units to the two ends; and
   a housing for containing the battery units and thermal conducting bars and conducting heat from the ends of the thermal conducting bars to outside of the housing;
   wherein each lateral face has a same area and shape; and
   wherein at least one end of the thermal conducting bar is connected to the housing and becomes an internal supporting structure of the housing.

2. The battery pack according to claim 1, further comprising a fixture for fixing the battery units and thermal conducting bars on the plane.

3. The battery pack according to claim 1, wherein the thermal conducting bars comprises a fixture for fixing the battery units on the plane.

4. The battery pack according to claim 1, wherein the battery unit is a rechargeable battery.

5. The battery pack according to claim 1, wherein the thermal conducting bar is made of a thermal conductive material.

6. The battery pack according to claim 5, wherein the thermal conductive material is a metal or alloy.

7. The battery pack according to claim 6, wherein the metal is aluminum.

8. The battery pack according to claim 1, wherein the thermal conducting bar is hollow.

9. The battery pack according to claim 8, further comprising a circulating system providing cooling liquid passing through the hollow portion of the thermal conducting bar from one end to the other for speeding up heat conduction.

10. The battery pack according to claim 9, wherein the cooling liquid is water, ethanol, glycol or oil.

11. The battery pack according to claim 1, wherein the number of lateral faces equals the number of battery units surrounding the thermal conducting bar.

12. The battery pack according to claim 1, wherein the thermal conducting bar is fixed to the housing by screws and heat of the thermal conducting bar can be conducted to outside of the housing via the screws or by contact with the housing.

13. The battery pack according to claim 1, wherein the housing is made of a thermal conductive material.

14. The battery pack according to claim 13, wherein the thermal conductive material is aluminum.

15. The battery pack according to claim 2, wherein the fixture is made of an insulator.

16. The battery pack according to claim 15, wherein the insulator is plastic.

17. The battery pack according to claim 3, wherein the fixture is made of thermal conductive material.

* * * * *